United States Patent [19]

Siebert

[11] 4,314,325
[45] Feb. 2, 1982

[54] METHOD AND CIRCUIT FOR PULSE-WIDTH CONTROL OF A BILATERAL DIRECT CURRENT CONTROL ELEMENT

[75] Inventor: Jürgen Siebert, Uttenreuth, Fed. Rep. of Germany

[73] Assignee: Siemens Aktiengesellschaft, Munich, Fed. Rep. of Germany

[21] Appl. No.: 170,990

[22] Filed: Jul. 18, 1980

[30] Foreign Application Priority Data

Jul. 30, 1979 [DE] Fed. Rep. of Germany ....... 2930920

[51] Int. Cl.³ ........................................... H02P 13/18
[52] U.S. Cl. ...................................... 363/98; 363/41; 363/132
[58] Field of Search ..................... 363/17, 41, 56, 58, 363/97–98, 131–132; 318/800, 801, 345 B, 345 E

[56] References Cited

U.S. PATENT DOCUMENTS

| | | | |
|---|---|---|---|
| 3,435,324 | 3/1969 | Bishop | 363/132 |
| 3,461,405 | 8/1969 | Bishop et al. | 363/132 |
| 3,523,236 | 8/1970 | Howell et al. | 363/42 |
| 3,605,005 | 9/1971 | Stolzy | 363/41 |
| 3,710,229 | 1/1973 | Jessee | 363/41 |
| 3,976,932 | 8/1976 | Collins | 363/132 |

*Primary Examiner*—William M. Shoop
*Assistant Examiner*—Peter S. Wong
*Attorney, Agent, or Firm*—Kenyon & Kenyon

[57] ABSTRACT

A circuit and method for controlling the amplitude and direction of load current in a bidirectional direct current control bridge of the type having four bridge arms, each such arm having an electronic switching element electrically disposed therein, and a load, illustratively an ohmic-inductive load, connected to the junctures of said bridge arms. Load current is conducted to the load by applying energizing pulses to each of the switching elements in a pair of diagonally disposed bridge arms, the respective pulse energizing signals being out of phase with respect to one another. Load current is responsive to the duration of the interval during which the switching elements in the diagonal pair of bridge arms are simultaneously conductive. Circuitry is provided for pulse energizing the electronic switching elements in the second diagonal pair of bridge arms, while inhibiting conduction of the pulse energizing signals to the first diagonal pair, in response to a change in polarity of a control signal. The amplitude of the control signal governs the pulse-width ratio of the pulse energizing signals, and therefore, the duration of the intervals of simultaneous conduction of the switching elements in the diagonal pair. Circuitry is provided for inhibiting the conduction of all pulse energizing signals for a predetermined interval of time in response to the change of polarity of the control signal.

9 Claims, 8 Drawing Figures

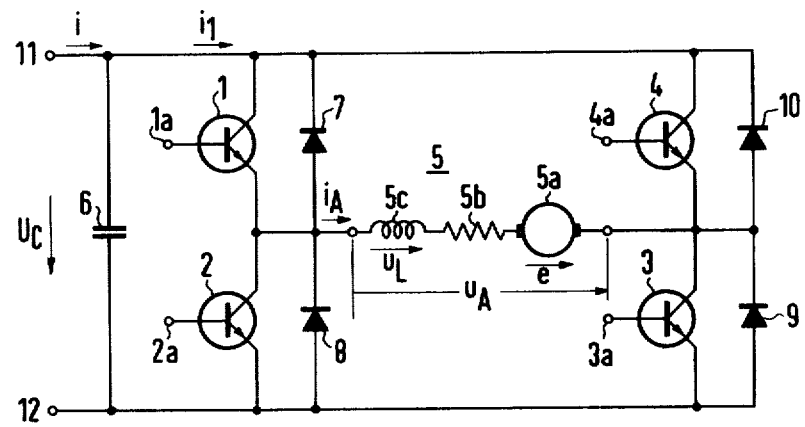
FIG 1
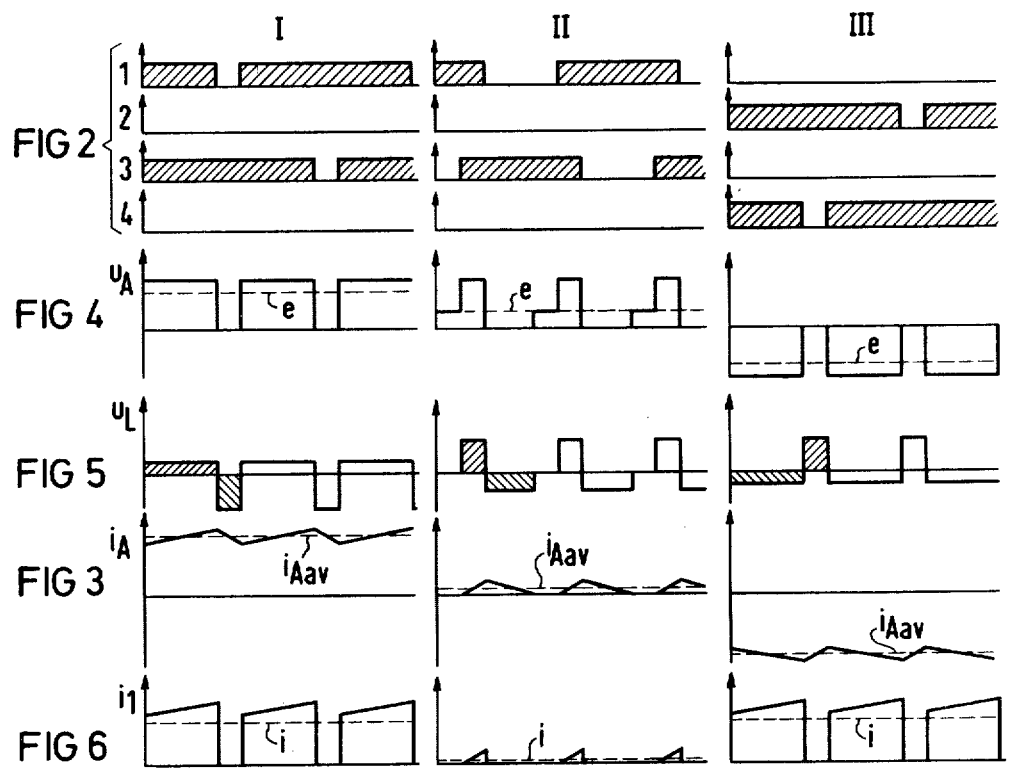

METHOD AND CIRCUIT FOR PULSE-WIDTH CONTROL OF A BILATERAL DIRECT CURRENT CONTROL ELEMENT

BACKGROUND OF THE INVENTION

This invention relates generally to circuits and methods for operating bilateral direct current control systems, and more particularly, to the operation of four-arm bridge circuits which control the amplitude and direction of current through loads, in response to pulse-width modulated signals.

One known system for controlling load current by the use of a four-arm bridge, each such arm having a switching transistor electrically disposed therein, is disclosed in "Siemens-Zeitschrift" 43 (1969), No. 5, pages 458 to 464. In this prior art arrangement, each of the arms of the bridge contains an electronic switching element. In operation, a first pair of electronic switching elements which are on diagonally disposed arms of the bridge circuit with respect to one another, are periodically and simultaneously closed and opened, while the remaining second pair of diagonally disposed switching elements remains open. Reversal of the current through the load is achieved by simultaneously opening and closing the second pair of switching elements, while the first pair remains opened. This method of operating a four bridge arm control circuit has the advantage of a linear relationship between the control voltage and the load voltage. Moreover, such a drive system may be simply implemented.

It is a disadvantage of the foregoing system that the polarity of the load voltage and the current which flows into the bridge changes during the opening intervals of the periodically operated electronic switches. This results because the inductive load component causes load current to remain flowing during the intervals that the operated switches are opened. Such current flows through bypass diodes which are disposed in shunt across each such electronic switch. Such diode current flows back into the power supply, in a direction opposite to the current flow during the time that such switches are closed. Load voltage is reversed concurrently with such bypass diode current. The effect of this operation is that the load will experience a current having a relatively large alternating current ripple component which produces additional heat loss in the load. Moreover, in situations where a motor is used as the load, the large alternating current component can create whining noises.

One prior art method for reducing the amplitude of the alternating current component in the load current by the use of pulse-width control is disclosed in U.S. Pat. No. 3,260,912. In this known system, a first pair of diagonally disposed electronic switching elements in the bridge are opened and closed during time intervals which are offset with respect to one another. Thus, during the open interval of each such electronic switching element, the diagonally associated electronic switching element remains closed. This offset driving arrangement provides an advantage over the hereinabove discussed simultaneous driving arrangement because the load current which continues to flow after a particular switching element is opened, as a result of the inductive component of the load, does not flow back into the power supply, but circulates through the closed electronic switching element and a bypass diode. This arrangement, therefore, produces after each cycle of switching elements closure which delivers to the load electrical energy from the power supply, a bypass phase which is distinguishable from the energy reversing backflow phase of the previously discussed arrangement, which does not reverse the load voltage, but reduces it to zero. Thus, the alternating current ripple component in the motor load current has the same pulse frequency as in the first-mentioned arrangement, but only one-half of the magnitude. This arrangement, however, has the disadvantage of a non-linear relationship between the control voltage and the load voltage, particularly in the range of small control voltages. Thus, it is possible in situations where small control voltages are utilized, that the load voltage would approach zero before the control voltage approaches zero. This results from the fact that the conductive intervals of diagonally disposed electronic switching elements cannot overlap because a safety interval must be maintained to prevent electronic switching elements which are disposed on the same half of the bridge from being simultaneously conductive and causing short circuit conditions. Similarly, an overlap of the conductive intervals of diagonally opposite switching elements can occur when negative control voltages are utilized only when such control voltages exceed predetermined negative values.

It becomes apparent, therefore, that a bilateral direct current control bridge, which is operated in accordance with the latter method described hereinabove, has a region of insensitivity in which the load voltage is zero for small control voltages. This operational characteristic is a significant disadvantage for most applications. The electronic switching elements of the second diagonal, which are conductive during the non-conductive interval of the said first pair of electronic switching elements, do not carry any current. The current is conducted through the shunt bypass diodes which are poled for conduction in a direction which is opposite to the forward conduction of the respectively associated switching elements. This may cause, in some applications, damage to the switching elements.

Accordingly, it is an object of this invention to provide an arrangement for controlling a bilateral control element in such a manner that the alternating current ripple component is minimized.

It is a further object of this invention to provide an arrangement for controlling a control bridge in a manner which achieves linearity between the control and load voltages.

SUMMARY OF THE INVENTION

The foregoing and other problems in the prior art are alleviated by this invention which controls a four-arm bridge control circuit in such a manner that diagonally disposed electronic switches are placed in conductive states during intervals which are offset from one another.

In the control arrangement according to the invention, each cycle of energy supply is followed by a bypass phase through an electronic switching element and a bypass diode, so that no reversal of the load current or load voltage occurs. The load current, therefore, contains an alternating current ripple component which is one-half of the magnitude of that contained in bilateral direct current control systems in which the load current and voltage are reversed. Since for each direction of load current only one pair of diagonally disposed electronic switches are placed in conductive states, there is no possibility of a short circuit occurring through the bridge as a result of the switching elements in the same half of the bridge being simultaneously conductive. Thus, a safety interval between conductive intervals is not required, thereby producing a linear control characteristic which does not contain a zone of insensitivity as discussed hereinabove for small control voltages. A safety interval must be provided only upon a controlled reversal of the direction of load current, which is produced by the transition of the control function from a first pair of diagonally disposed electronic switches, to a second diagonal pair. Although such an interval is required to insure that switching elements disposed in the same half of the bridge circuit are not simultaneously conductive, the safety interval has no detrimental effect upon the control function because its duration is negligible with respect to the period of time required between the time that a current reversing control signal is applied, and the actual reversal of the load current. This arrangement has the further advantage of reducing losses in the bridge circuit because, for each load current flow direction, only two electronic switching elements are operated.

In one specific embodiment of the invention, an ohmic-inductive load is electrically disposed between respective diagonal bridge arms of a four-arm bridge circuit, each such arm having an electronic switching element which is shunted by a bypass diode. The bypass diode is poled for conduction in a direction opposite to the forward conduction of the associated switching element. First and second diagonal pairs of electronic switching elements control respective positive and negative load current directions, in response to a control signal which produces corresponding pulse-width signals. Such signals are conducted to the respective one of the first or second diagonal pairs so as to cause respective positive or negative load current to flow. Circuitry is provided for preventing the application of pulse-width signals to the particular one of the diagonal pairs which is not in use. Illustratively, upon the application of such pulse-width signals to the first diagonal pair of switching elements in the bridge arm, the application of signals to the second diagonal pair is prevented by blocking circuitry.

Additional circuitry is provided to introduce a time delay prior to the application of signals which would reverse the direction of load current. Assuming that the bridge is being operated to produce positive load current, reversal of the polarity of the control signal will cause immediate discontinuation of the pulse-width signal to the first diagonal pair. Moreover, the application of pulse-width signals to the second diagonal pair, which would cause reversal of the load current, is delayed by a predetermined interval. This operation implements the hereinabove described required safety interval between reversals in the direction of load current.

In one embodiment of the invention, the control signal is conducted to the input of a polarity sensing stage, which, if the polarity of the control signal is positive, conducts a delayed signal to the switching element in the first diagonal pair. Conversely, if the polarity of the control signal is negative, a delayed signal is conducted to the second diagonal pair. EAch switching element has an assodiated AND gate which receives one of the time delayed signals, and a second signal responsive to the control signal and a periodic signal, which may have a triangular wave shape. The circuitry for combining the control signal and the periodic signal produces at least two second signals which are out of phase with respect to each other and which have pulses which vary in width in response to the relative amplitudes of the control signal and the periodic signal. Each such second signal is conducted to an AND gate which is associated with a respective one of the switching elements in the first diagonal pair. Polarity inverted counterparts of the second signals are conducted to AND gates associated with respective ones of the switching elements in the second diagonal pair. The application of the second signals, or the inverted second signals, to the switching elements is controlled by respective outputs of a polarity sensing stage, which produces the hereinabove described delayed signals.

BRIEF DESCRIPTION OF THE DRAWINGS

Comprehension of the invention is facilitated by reading the following detailed description in conjunction with the annexed drawings, in which:

FIG. 1 is a schematic representation of a four-arm bridge circuit for controlling load current through a load;

FIG. 2 is a timing diagram of pulse-width signals which are applied to respective switching elements in FIG. 1;

FIG. 3 illustrates the amplitude and wave shape of the load current which flows in response to the signals of FIG. 2;

FIG. 4 is a timing diagram of the load voltage responsive to the pulse-width signals of FIG. 2;

FIG. 5 illustrates the wave form of the voltage across the armature inductance portion of the load in FIG. 1, in response to the pulse-width signals of FIG. 2;

FIG. 6 shows the wave form of the current which flows into the bridge;

DETAILED DESCRIPTION

Figure 7:
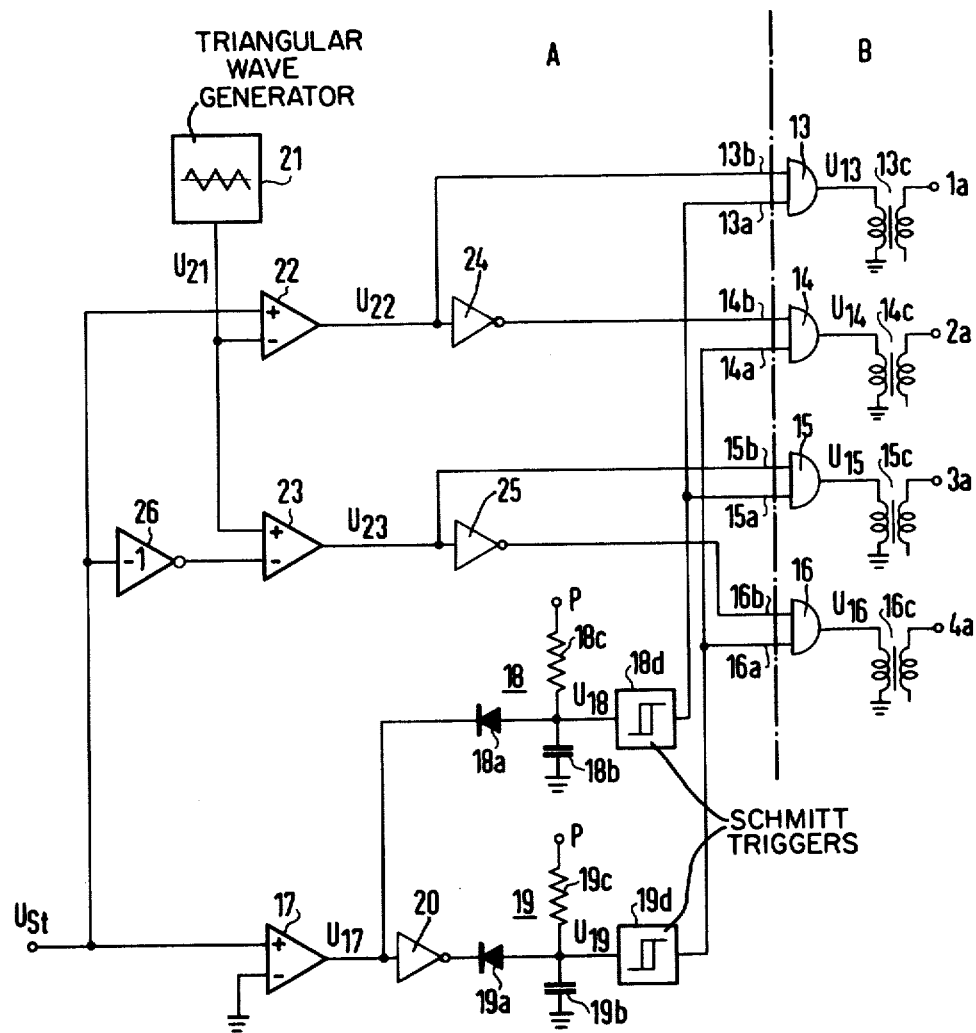
FIG. 7 shows, partly in schematic form and partly in block and line representation, an embodiment of a control system for operating the bridge of FIG. 1.

FIG. 1 shows the basic circuit diagram of a bilateral direct current control bridge. Four transistors 1 through 4 are arranged as electronic switching elements in respective arms of the bridge circuit which are electrically disposed between terminals 11 and 12. A direct current power supply (not shown) provides a voltage $U_C$ across terminals 11 and 12. Filter capacitor 6, which serves to accumulate or release electrical energy pulses, is connected across terminals 11 and 12. Each of the switching elements 1 through 4 is shunted by a respective one of bypass diodes 7 through 10, each of which is poled so as to conduct current in a direction opposite to the forward conduction of the associated switching elements. A load 5, which in this embodiment of the invention is a direct current motor which is illustrated in the Figure by an equivalent circuit, contains an armature 5a, an equivalent armature resistance 5b and an equivalent armature inductance 5c. In this arrangement, motor 5 can be driven in either a clockwise or counterclockwise direction, or can be braked. During the braking operation, the motor operates as a generator which supplied electrical energy to the power supply.

FIGS. 2 through 6 illustrate correlated timing diagrams of various voltages and currents which are present during the operation of the bridge circuit of FIG. 1.

In FIGS. 2 through 6, the operating mode represented under Columns I and II will produce clockwise rotation of motor 5. Counterclockwise rotation is achieved when the circuit of FIG. 1 is operated in the mode represented under III. During the operation of the circuit in modes I and II, load current $i_A$ flows in a positive direction, as shown in FIG. 1. In operating mode I, load current $i_A$ is near its positive maximum value. However, in operating mode II, the motor current $i_A$ is substantially decreased. Operating mode III results in a load current $i_A$ which is near a negative maximum value. Thus, load current $i_A$ flows in a direction opposite to that shown in FIG. 1, resulting in counterclockwise rotation of motor 5.

Referring to FIG. 2, in operating mode I, switching elements 1 and 3 are simultaneously conductive during a first control phase. As shown in FIG. 4, such simultaneous conduction causes load voltage $u_A$ to be positive, at a value which closely approximates the full supply voltage $U_C$. Load voltage $u_A$ differs from supply voltage $U_C$ only by an amount which corresponds to the voltage drops across switching elements 1 and 3. For purposes of this analysis, such voltage drops will be ignored. The presence of load voltage $u_A$ across motor 5 causes a rising load current $i_A$ to flow, as shown in FIG. 3. The slope of the rise in load current $i_A$ is a function of the value of motor inductance 5c. In this first control phase of operating mode I, which is represented by the simultaneous conductive states of switching elements 1 and 3, as shown in FIG. 2, and the resulting first load voltage pulse shown in FIG. 4, load current $i_A$, in FIG. 3, is identical to bridge current $i_l$ shown in FIG. 6. Filter capacitor 6 causes power supply current i to be smoothened at a mean value which is represented by the broken line in FIG. 6. The wave form of the voltage $u_L$ across inductance 5c, as shown in FIG. 5, has a small positive value during this first control phase.

In a second control phase during the operating mode I, switching element 1 is in a non-conductive state while switching element 3 remains conductive. Load current $i_A$ remains flowing, but decreasing in value, by operation of motor inductance 5c. During this second phase, load current $i_A$ flows through bypass diode 8, motor 5, and switching element 3. Resistance losses in these circuit elements cause the load current $i_A$ to decline. Moreover, since motor 5 is essentially short circuited for this current direction by switching element 3 and bypass diode 8, motor voltage $u_A$ in FIG. 4 becomes essentially zero, because an induced voltage e which results because of the continuing rotation of motor 5, is counteracted by opposing voltage $u_L$ at the armature inductance 5c. Thus, during this second phase, load voltage $u_A$ is zero resulting from the sum of induced voltage e shown in FIG. 4, and negative voltage $u_L$, shown in FIG. 5.

In a following third control phase, switching elements 1 and 3 again are simultaneously conductive. This results in the same current and voltage characteristics which were described hereinabove with respect to the first control phase.

In a fourth control phase, switching element 1 remains conductive while switching element 3 is cutoff. In this fourth control phase, motor current $i_A$ continues to flow through switching element 1 and bypass diode 10. The remaining current and voltage conditions are similar to those described with respect to the second control phase. As evidenced by the high value of load current $i_A$, during operating mode I, the torque or speed of rotation of motor 5 is relatively high because the overlap of the conductive intervals of switching elements 1 and 3 are such that energy from the power supply is conducted to motor 5 for relatively long periods of time.

Referring now to operating mode II in FIGS. 2 through 6, the conductive intervals of switching elements 1 and 3 are shorter than those described hereinabove with respect to operating mode I. Thus, the periods of simultaneous conductivity are relatively short, resulting in a relatively small average value of motor current $i_A$, and a reduced motor torque and speed of rotation. Additionally, the induced voltage e of motor 5 is also reduced. In this operating mode, the reduced average value of load current $i_A$ causes the motor load current to become zero during intervals when only one of the switching elements is in a conductive state. During such times as load current $i_A$ becomes zero, so does voltage $u_L$ across motor inductance 5c. Consequently, during such times as inductance voltage $u_L$ becomes zero, the induced voltage e is not counteracted, and therefore, load voltage $u_A$ assumes the value of induced voltage e during such times as only one of the switching elements is conductive and inductance voltage $u_L$ is zero.

During operation of the bridge circuit in the mode of III of FIGS. 2 through 6, motor 5 is driven at high torque or high speeds in a counterclockwise direction. In this operating mode, switching elements 4 and 2 are placed in conductive states, while switching elements 1 and 3 remain non-conductive. The wave shapes of currents and voltages which are produced throughout the circuit during this operating mode correspond to those produced during the hereinabove described operating mode I, except that the polarities are reversed. Thus, during the bypass phases, load current $i_A$ flows through switching element 2 and bypass diode 9, and switching element 4 and bypass diode 7, respectively.

As shown in the foregoing discussion with respect to operating mode I, II, and III, it is possible to control a load current in either direction as long as the conductive state of respectively operated diagonal pairs of switching elements have conductive intervals which are longer than the non-conductive intervals. This will produce overlap times which represent simultaneous conductive states in the switching elements of a diagonal pair. If the conductive intervals become equal in duration to the non-conductive intervals, there will not be an overlap of conductive intervals, and motor current $i_A$ will become zero. This arrangement for operating a control bridge eliminates the hereinabove described zone of insensitivity when load currents are small, as a result of the fact that such small motor currents are advantageously adjustable by control over the period of simultaneous conduction of the switching elements in a respective one of the diagonal pairs. As shown in FIG. 4, load voltage $u_A$ does not reverse its polarity when switching elements 1 through 4 are pulsed. Thus, the alternating current ripple component in load current $i_A$ remains small. As previously indicated, a large alternating current ripple component would increase the thermal losses in load 5, and if such a load as a motor, result in whining noises.

As previously indicated, it is necessary to observe a safety time interval between reversals in the direction of load current, so as to insure that switching elements 1 and 2, or 4 and 3, are never simultaneously conducted so as to produce a short circuit condition. In operation, such a safety interval appears as a dead interval which is substantially more tolerable than an insensitivity zone. Circuitry for implementing such a safety interval between reversals in load current is implemented in drive system A which is shown in FIG. 7, for driving the switching elements of FIG. 1. Drive system A contains a generator 21 which produces at it output a signal which, in this embodiment of the invention, has a triangular wave shape which is symmetrical with respect to a zero value, and equal positive and negative slopes. One such triangular wave generator is disclosed in "Halbleiter-Schaltungstechnik" (Semiconductor circuit design) by Tietze-Schenk, 3rd, Ed., page 436. The output signal of generator 21 is conducted to an inverting input of operational amplifier 22, and to a non-inverting input of operational amplifier 23. Operational amplifiers 22 and 23 are of the type which produce logical output signals in response to the coincidence of the values of the respective input signals. The control signal $U_{St}$ for controlling load current $i_4$ is conducted to a non-inverting input of operational amplifier 22, and to an inverting stage 26, which is connected at its output to an inverting input of operational amplifier 23. Operational amplifier 22 is connected at its output to an input 13b of AND gate 13, which is disposed in a blocking stage B. The output of operational amplifier 22 is also connected to the input of an inverter 24, which is connected at its output to an input 14b of AND gate 14, which is also disposed in blocking stage B. Operational amplifier 23 is connected at its output to an input 15b of AND gate 15, and to the input of an inverter 25, which is connected at its output 16b of AND gate 16. AND gates 15 and 16 are both in blocking stage B.

Control signal $U_{St}$ changes in polarity when it is desired to reverse the direction of load current $i_4$. The polarity of control signal $U_{St}$ is detected by polarity sensing circuitry which includes operational amplifier 17, which receives the control signal at a non-inverting input. An inverting input to operational amplifier 17 is connected to a reference potential. The operational amplifier is of a type which is overdriven so as to produce at its output logical signals. The output of operational amplifier 17 is conducted to delay stages 18 and 19, which generate the hereinabove described safety intervals between the reversal in the direction of load current $i_4$. Each of delay stages 18 and 19 contains a respective diode 18a and 19a, which are connected at their annodes to timing circuits comprising respective resistors 18c and 19c, and capacitors 18b and 19b. The timing circuits are connected to respective Schmitt triggers 18d and 19d. The output of operational amplifier 17 is conducted to the cathode of diode 18a, and to an inverter 20 which is connected at its output to the cathode of diode 19a. The output of delay stage 18 at Schmitt trigger 18d is connected to an input 13a of AND gate 13 and input 15a of AND gate 15. The output signal of delay stage 19, at Schmitt trigger 19d, is conducted to an input 14a of AND gate 14 and to an input 16a of AND gate 16.

The outputs of AND gates 13 through 16 are conducted to respectively associated ones of the bases of transistor switching elements 1a through 4a by means of respective pulse transformers 13c to 16c, in this embodiment.

Figure 8:
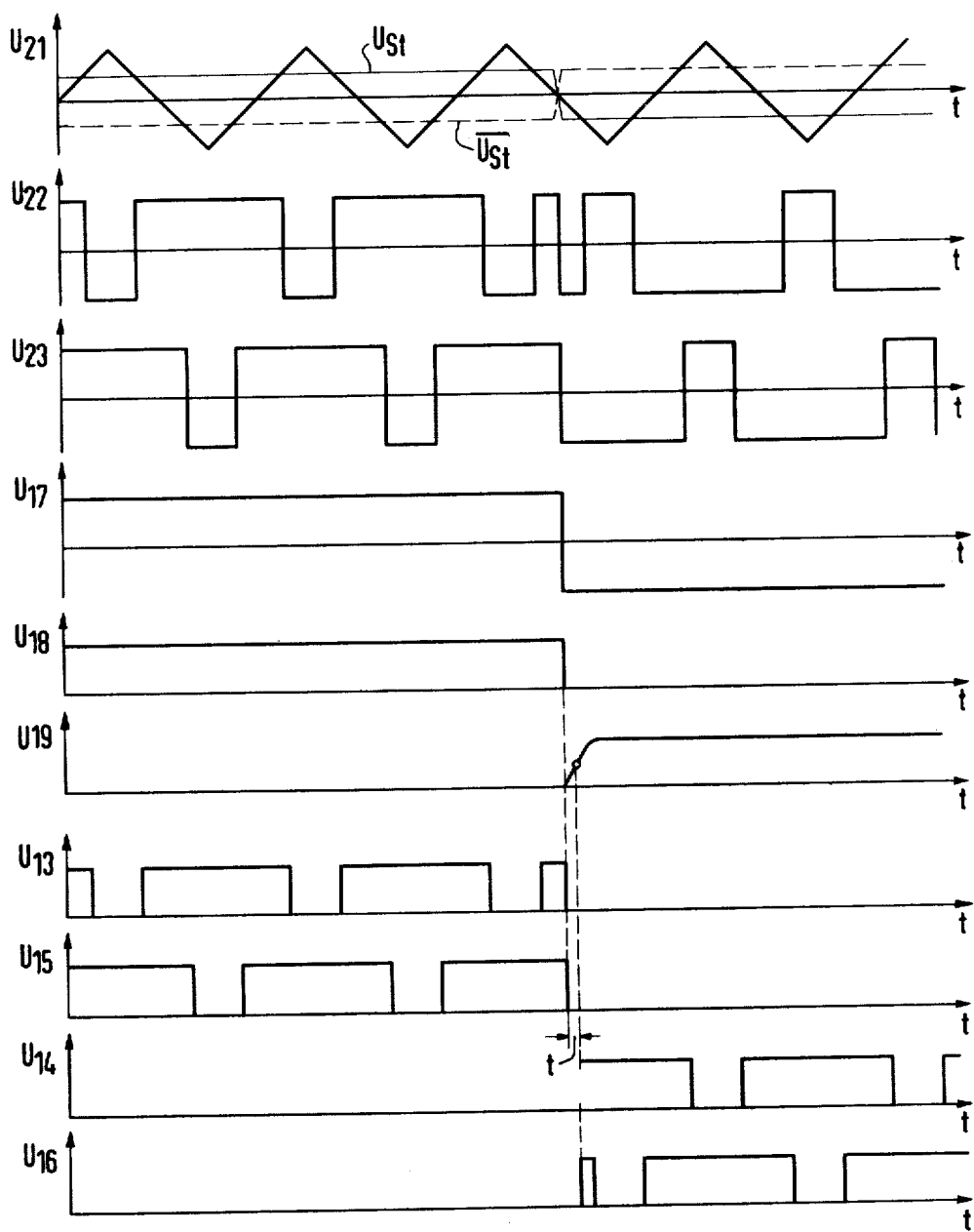
FIG. 8 is a timing diagram which is useful in describing the operation of the control system of FIG. 7.

FIG. 8 is a timing diagram of the signals which are present at various points in drive system A, shown in FIG. 7. The first time scale of FIG. 8 shows the wave shape of output signal $U_{21}$, at the output of generator 21.

In addition, this time scale shows the actual control signal $U_{St}$ in solid line, and the inverted control signal, which may be at the output of inverter 26, in broken line. The signals shown in time scales identified as $U_{22}$ and $U_{23}$ correspond to the output signals of operational amplifiers 22 and 23, respectively. Signal $U_{22}$ is logical $+1$ if the value of triangular signal $U_{21}$ is less than the value of control signal $U_{St}$. Also, the value of signal $U_{22}$ is logical $-1$ if the value of $U_{21}$ is greater than the value of control signal $U_{St}$. The output of operational amplifier 23, as indicated by the time scale $U_{23}$, has a value of logical $+1$ if the value of $U_{21}$ is more positive than the inverted control signal $\overline{U_{St}}$. Conversely, the value of $U_{23}$ will be a logical $-1$ if the value of $U_{21}$ is more negative than the value of inverted control signal $\overline{U_{St}}$. A comparison of signals $U_{22}$ and $U_{23}$ in FIG. 8 with the control signals in FIG. 2 shows that the signals $U_{22}$ and $U_{23}$ can be used to drive switching elements 1 through 4 directly, when control signal $U_{St}$ is positive. Additionally, signals $U_{22}$ and $U_{23}$ must be inverted if they are to drive switching elements 1 through 4 directly when control signal $U_{St}$ is negative. In the embodiment of FIG. 7, such inversion is achieved by inverters 24 and 25.

FIG. 8 shows that the width of the pulses in signals $U_{22}$ and $U_{23}$ can be varied in response to variations in the amplitude of the control signal $U_{St}$, which causes corresponding inverted variations in $\overline{U_{St}}$. When the amplitude of $U_{St}$ exceeds the peak value of triangular wave form $U_{21}$, the drive signals at $U_{22}$ and $U_{23}$ will be such that both will represent continuous logic $+1$ states. Conversely, when control signal $U_{St}$ assumes a value of zero, the signals $U_{22}$ and $U_{23}$ will not have any overlap. Accordingly, load current $i_4$ will be zero.

As previously indicated, there should be provided a dead interval when control signal $U_{St}$ changes polarity, thereby causing the conduction of drive pulses to change over from one diagonal pair to the other. With respect to the embodiment of FIG. 7, switching elements 1 and 3 should be energized when control signal $U_{St}$ is positive, and switching elements 2 and 4 when control signal $U_{St}$ is negative. Operational amplifier 17 performs the function of a polarity sensing stage, and produces at its output a signal $U_{17}$ which has a value of logical $+1$ when the control signal is positive, and a value of logical $-1$ if the control signal is negative. The output signal of operational amplifier 17 is shown in FIG. 8 as $U_{17}$. Signal $U_{17}$ is conducted to AND gates 13 and 15, and, after inversion by inverter 20, to AND gates 14 and 16. Thus, when control signal $U_{St}$ is positive, the drive pulses for switching elements 1 and 3 are released, and when the control voltage is negative, the drive pulses for switching elements 2 and 4 are released. To prevent simultaneous conductive states in switching elements 1 and 2, or 3 and 4, a time interval t is provided during which all drive pulses are blocked. The time interval t is produced by the delay stages 18 and 19. For example, if signal $U_{17}$ changes from a logical $+1$ to a logical $-1$, as shown in FIG. 8, capacitor 18b, which is charged to the potential of power supply P by resistor 18c, is very quickly discharged, thereby causing the output signal of delay stage 18 at the capacitor, shown as signal $U_{18}$ in FIG. 8, to go to zero almost immediately. This reduced value of signal $U_{18}$ is conducted through Schmitt trigger 18d so as to disable AND gates 13 and 15 and thereby block the passage of pulses to switching elements 1 and 3, almost immediately. At this moment, capacitor 19b begins to charge through resistor 19c because a positive voltage is present at the output of inverter 20, and therefore, no discharge current can flow off through diode 19a. As soon as the voltage at capacitor 19b has reached a threshold value in Schmitt trigger 19d, AND gates 14 and 16 are enabled by the output signal of Schmitt trigger 19d, thereby permitting the passage of pulses to switching elements 2 and 4. If control signal $U_{St}$ were to change polarity in a positive direction, the above described operation would repeat itself with capacitor 19b quickly discharging and capacitor 18b charging through resistor 18c so as to cause the output of Schmitt trigger 18d to enable AND gate 13 and 15. Thus, Schmitt trigger 18d and 19d serve to establish an unequivocal threshold value for the enablement of their respectively associated AND gates, in response to the time constants of the respectively associated ones of resistors 18c and 19c, and capacitors 18b and 19b. The time constant represented by the charging of the capacitors through their respective resistors creates a time delay t during which all switching element drive pulses are inhibited, and which prevent any possibility of bridge short circuits. This timing function is clearly shown in FIG. 8 in the switching element drive signals $U_{13}$ to $U_{16}$.

It is to be remembered that, although the inventive concept disclosed herein is described in terms of specific embodiments and particular applications, persons skilled in the pertinent art can generate additional embodiments without departing from the spirit or exceeding the scope of the invention. The block, line and schematic illustrations depicted in the drawings are merely illustrative embodiments proferred to facilitate comprehension of the invention, and should not be construed to limit the scope thereof.

What is claimed is:

1. A method of controlling a bilateral direct current control bridge of the type having four bridge arms, each arm having an electronic switching element electrically disposed therein for conducting a load current to a load which is connected between respective diagonally disposed pairs of bridge arms, the electronic switching elements each being of the type which will conduct current in response to an energizing signal, the method comprising the step of
   a. applying first and second energizing pulse signals respectively to first and second electronic switching elements which are each disposed in diagonally associated bridge arms, said first and second pulse signals being out of phase with respect to one another, the load current being responsive in amplitude to a time interval during which the first and second electronic switching elements are simultaneously conductive.

2. The method of claim 1 wherein each of said first and second energizing pulse signals has a pulse-width ratio which is controlled by the step of
   a. comparing the amplitude of a control signal with the amplitude of a periodic signal.

3. A circuit arrangement for controlling a bilateral direct current control bridge of the type having four bridge arms, each bridge arm having an electronic switching element electrically disposed therein for conducting a load current to a load which is connected between respective diagonally disposed pairs of bridge arms, the electronic switching elements each being of the type which will conduct current in response to an energizing signal, the circuit further comprising;
   a. energizing means for applying first and second energizing pulse signals respectively to first and second electronic switching elements in an associated first diagonal pair of bridge arms, said first and second pulse signals being out of phase with respect to one another, the load current being responsive in amplitude to a time interval during which the first and second electronic switching elements are simultaneously conductive.

4. The circuit of claim 3 wherein said energizing means comprises:
   a. means for receiving a control signal which varies in amplitude,
   b. generator means for producing a periodic signal,
   c. first comparator means for producing said first pulse energizing signal having a pulse-width ratio which is responsive to the relative amplitudes of said control signal and said periodic signal,
   d. inverter means for producing an inverted control signal, and
   e. second comparator means for producing said second pulse energizing signal having a pulse-width ratio which is responsive to the relative amplitudes of said inverted control signal and said periodic signal.

5. The circuit of claim 4 wherein said control signal varies in polarity, the circuit further comprising
   a. polarity sensing means for producing first and second polarity signals, each polarity signal having first and second states, said first and second polarity signals being in said first and second states, respectively, when said control signal has a positive polarity, and said first and second polarity signals being in said second and first states, respectively, when said control signal has a negative polarity, and
   b. means for controlling conduction of said first and second pulse energizing signals to the electronic switching elements in response to said first and second polarity signals.

6. The circuit of claim 5 wherein said means for controlling conduction comprises at least a first AND gate.

7. The circuit of claim 5 wherein there is further provided
   a. time delay means for inhibiting conduction of said first and second pulse energizing signals for a predetermined interval of time after said control signal changes polarity.

8. The circuit of claim 7 wherein said polarity sensing means comprises
   a. an overdriven operational amplifier having an input terminal for receiving said control signal and an output terminal for providing a polarity indicating signal having first and second states, and
   b. first and second trigger means for respectively producing said first and second polarity signals in response to said polarity indicating signal.

9. The circuit of claim 8 wherein said time delay means comprises
   a. first and second timing circuits, each connected to a respectively associated one of said first and second trigger means, for delaying changes from said second to first states of at least one of said first and second polarity signals, in response to a change of state of said polarity indicating signal.

* * * * *